United States Patent [19]

Satran

[11] Patent Number: 5,145,295

[45] Date of Patent: Sep. 8, 1992

[54] MILLING CUTTING INSERT

[75] Inventor: Amir Satran, Kfar Havradim, Israel

[73] Assignee: Iscar Ltd., Tefen, Israel

[21] Appl. No.: 699,975

[22] Filed: May 13, 1991

[30] Foreign Application Priority Data

May 14, 1990 [GB] United Kingdom ................. 9010769

[51] Int. Cl.$^5$ ................................................ B23C 5/20
[52] U.S. Cl. ..................................... 407/113; 407/116
[58] Field of Search ........................ 407/113, 114–116

[56] References Cited

U.S. PATENT DOCUMENTS

4,616,962  10/1986  Ushijima et al. ................. 407/114 X

Primary Examiner—Steven C. Bishop
Attorney, Agent, or Firm—Burgess, Ryan & Wayne

[57] ABSTRACT

A replaceable cutting insert for use in a peripheral rotary milling cutter and being formed with at least one cutting edge defined between a cutting rake surface and a relief flank surface of the insert. The relief flank surface comprises a first portion defined between the cutting edge and an intermediate portion of the relief flank surface and a second portion defined between the intermediate portion and a base of the insert. The first portion presents a first relief flank angle which is significantly greater than a second relief flank angle presented by the said second portion.

17 Claims, 7 Drawing Sheets

MILLING CUTTING INSERT

FIELD OF THE INVENTION

This invention relates to exchangeable hard metal cutting inserts for use with a peripheral, rotary, milling cutter comprising a substantially cylindrical holder in which are formed one or more peripheral recesses in which are respectively and releasably mounted a corresponding number of such inserts, the or each recess furthermore providing for a swarf space in front of each insert.

BACKGROUND OF THE INVENTION

The cutting insert used in milling cutter tools consists generally of a prismatic body having a planar base from which extend side surfaces—relief flank surfaces—which are intersected by the upper surface—the cutting rake surface. The cutting insert has at least one cutting edge which is defined as an edge created by the intersection of the cutting rake surface and the relief flank.

The insert is so held in the tool that the cutting edge is located in the circular cutting path of the tool and is inclined with reference to the rotary axis by an angle referred to as the axial rake angle.

The magnitude of the axial rake angle has a direct influence on the stability of the tool during operation and also on the durability of the cutting edge. In general, it is advantageous to have the inserts disposed at large axial rake angles. With tools having interchangeable inserts, providing for such large axial rake angles gives rise to a structural weakening of the tool. In consequence, the most common milling cutter tools are constructed for use with relatively low axial rake angles.

In addition to the axial rake, another characteristic of the insert which is of considerable significance on the operational efficiency of the tool is the relief angle of the insert. As used in the specification, the term "relief angle" is the angle subtended between the relief flank of the insert when mounted in the milling cutter, and the tangent of the circular path defined by a point on the cutting edge. The term "relief flank angle", on the other hand, is the angle defined between the relief flank of the insert and a line normal to the base of the insert.

It is known that with inserts for milling cutter tools the relief angles employed are relatively large as compared with the angles used with stationary cutting tools, and this is particularly the case with milling tools having low diameter cutting paths. Increasing the relief angle leads to a weakening of the cutting edge and there is in consequence a limitation of the magnitude of the relief angle. The magnitude of the relief angle is determined in accordance with the material of the work piece, the material from which the cutting edge is formed and the cutting path diameter of the tool. In general, with hard and tough work piece materials, the relief angle is between 6° to 8° with tools of high speed steel, and between 5° to 7° with carbide tools. On the other hand, with work pieces of mild steels, cast iron, etc., the relief angle can be as high as 20°.

As far as the relief flank angle is concerned, these are generally chosen to be in the general range of 15° to 20° for relatively soft materials and in the general range of 11° to 15° for relatively hard materials.

Various design and operational considerations indicate the use of inserts with flank relief angles which are in the higher regions of the range. In this connection, however, the higher the flank relief angle associated with the cutting edge of the insert, the greater the degree of unsupported overhang of the relief flank vis-à-vis the tool seating. Furthermore, it will readily be appreciated that serious difficulties arise when, for example, it is desired to securely locate an insert having a relatively high relief flank angle in a cutter tool seating designed to accommodate an insert having a lower relief flank angle.

SUMMARY OF THE INVENTION

It is an object of the present invention to provide a new and improved cutting insert for a milling cutter tool in which the above-referred-to disadvantage is substantially reduced or overcome.

According to one aspect of the present invention, there is provided for use in a peripheral rotary milling cutter having a cylindrical holder and at least one replaceable, peripherally disposed cutting insert, a cutting insert being formed with at least one cutting edge defined between a cutting rake surface and a relief flank surface of the insert, characterised in that the relief flank surface comprises a first portion defined between said cutting edge and an intermediate portion of said relief flank surface and a second portion defined between said intermediate portion and a base of the insert, said first portion presenting a first relief flank angle, said second portion presenting a second relief flank angle, said first relief flank angle being significantly greater than said second relief flank angle when said intermediate portion which bridges said first and second portions being directed transversely with respect to said first and second portions.

Preferably, the first relief flank angle lies in the range of 7° to 20°, whilst the second relief flank angle is in the range of 0° to 15°. In accordance with a preferred embodiment of the invention, the first relief flank angle is substantially equal to 15°, whilst the second flank relief angle is substantially equal to 11°.

Thus, with such an insert in accordance with the invention, whilst the first relief flank angle can be chosen to be sufficiently high, the fact that the second relief flank angle is significantly lower ensures that the degree of unsupported overhang vis-à-vis the tool seating is reduced. Furthermore, the insert in accordance with the invention can be securely located in a cutter tool seating normally designed to accommodate inserts which have this lower relief flank angle.

Preferably the cutting insert is of substantially parallelipipedal shape, a first pair of opposite cutting edges being respectively defined between first pairs of cutting rake surfaces and relief flank surfaces, a second pair of opposite cutting edges being respectively defined between second pairs of cutting rake surfaces and relief flank surfaces; the first pair of relief flank surfaces being formed as indicated above whilst the second pair of cutting rake and relief flank surfaces are continuously curved so that their insert rake and relief angles as defined with respect to the cylindrical holder remain substantially invariant along the lengths of the respective cutting edges.

This feature concerning maintaining the insert relief and rake angles substantially invariant and the advantages arising therefrom is described in U.S. Pat. No. 5,052,863 contents whose are hereby incorporated by way of reference.

The second pair of cutting edges are preferably spaced from their associated rake surfaces by respective land surfaces, each land surface being so curved that the land surface angle as defined with respect to the cylindrical holder remains substantially invariant along the length of the cutting edge.

In accordance with a further preferred embodiment of the invention, the second pair of cutting edges are curved, each forming part of the curved side of a plane which intersects a cylinder, constituting a surface of revolution of said cutting edge, at an angle corresponding to the axial rake angle of the insert in the milling cutter.

This feature concerning the curvature of the cutting edge and the advantages arising therefrom form the subject of copending European Patent Application Serial No. 90303589.7 whose contents are hereby incorporated by way of reference.

The cutting insert in accordance with the invention and being of parallelipipedal shape can be so formed that one and the same insert can be alternately used, in appropriate holders, for effecting shoulder and face milling. For this purpose, the relief flank surfaces of the insert constitute two pairs of successive relief flank surfaces, each pair having a common insert corner, the cutting edge of one of the relief flank surfaces of each pair being associated with a wiper formed on the other relief flank surface of that pair adjacent a common insert corner.

Preferably, a first of the relief flank surfaces of said pair is of extended length than the second of the relief flank surfaces of said pair, the wiper surface on said second relief flank surface being formed on a projection of said insert.

In order to ensure that the different cutting edges of the cutting insert used for the different kinds of milling referred to above present an optimal axial rake angle, the constituent cutting edges of the second pair slope in respectively opposite senses towards the insert base, each such second cutting edge sloping towards the insert base in a direction from a leading end of the cutting edge, whilst each first cutting edge slopes towards the insert base in a direction from a leading end of the cutting edge by an angle of between 0° and 15°.

Preferably, the first cutting edges are substantially parallel to the insert base edges.

The cutting inserts in accordance with the invention are preferably formed by pressing and sintering with their wiper surfaces either formed during the pressing operation or by a subsequent grinding operation.

BRIEF DESCRIPTION OF THE DRAWINGS

For a better understanding of the present invention and to show how the same may be carried out in practice, reference will now be made to the accompanying drawings, in which.

SPECIFIC DESCRIPTION OF THE INVENTION

The insert now to be described is of the same general kind described in U.S. Pat. No. 5,052,863 previously referred to and the description therein is hereby incorporated by way of reference and references will be made to that description where necessary, in order to avoid unnecessary repetition of the details of the construction of the insert.

As seen in FIGS. 1 through 12 of the drawings, a cutting insert 1 is of parallelipipedal shape and is formed with a first pair of opposite cutting edges 2 and 3 respectively defined between a first pair of cutting rake surfaces 4 and 5 and a first pair of relief flank surfaces (only one, 6, being shown). The cutting insert is furthermore provided with a second pair of opposite cutting edges 7 and 8 respectively defined between a second pair of cutting rake surfaces 9 and 10 and a second pair of relief flank surfaces (only one, 11, being shown).

Figure 1:
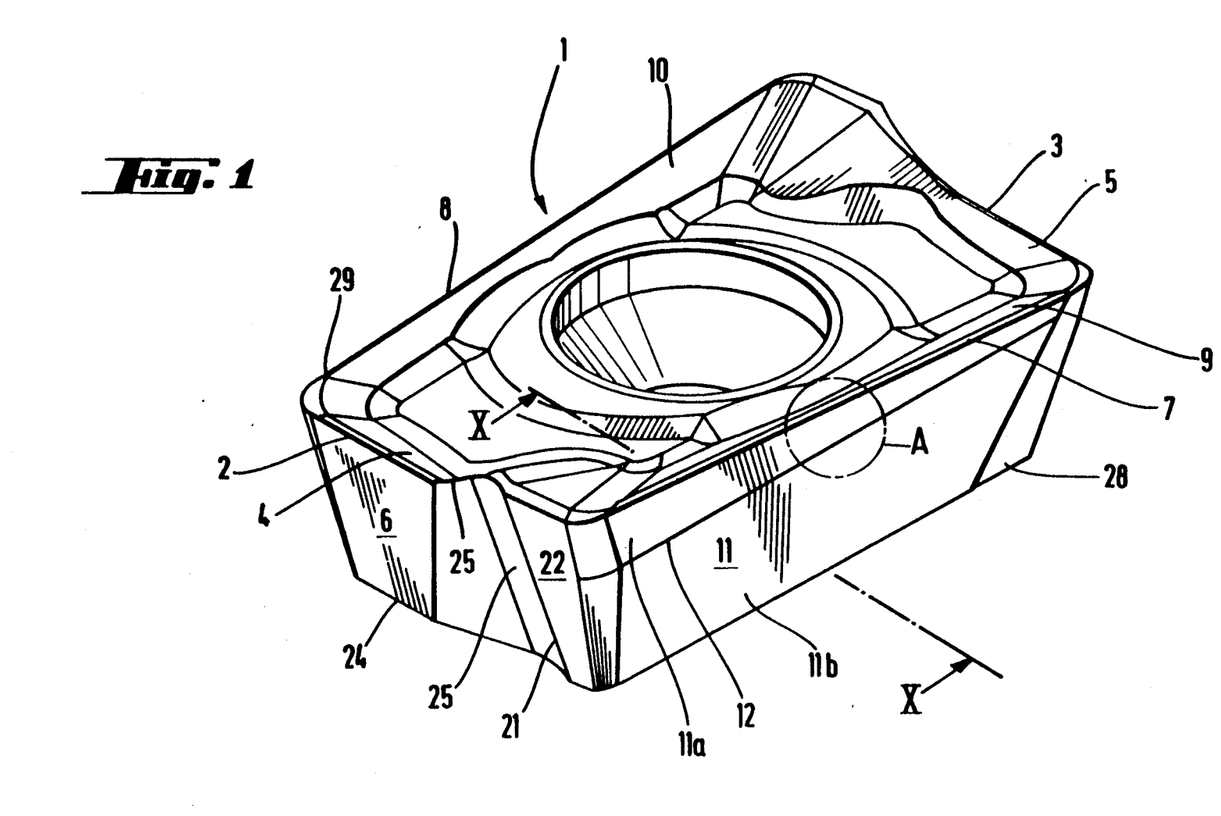
FIG. 1 is a perspective view of a cutting insert in accordance with the invention.
Figure 2:
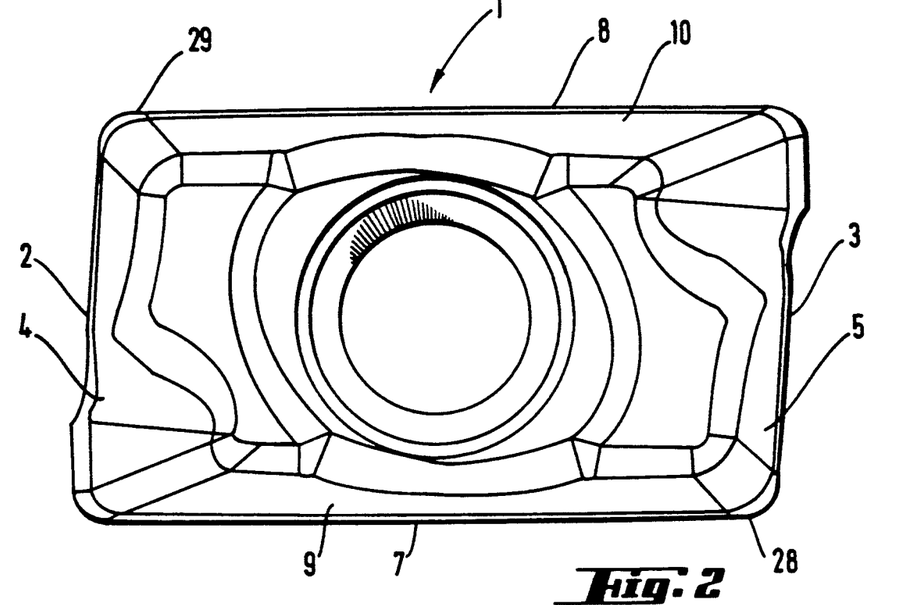
FIG. 2 is a plan view from above of the insert shown in FIG. 1.
Figure 3:
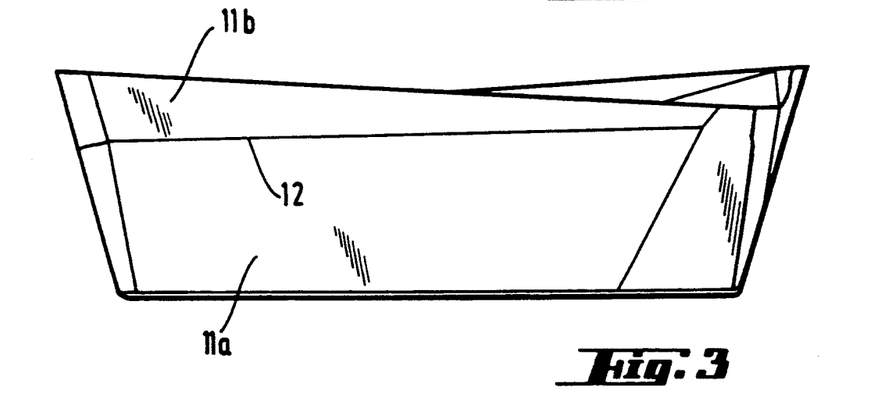
FIG. 3 is a side elevation of the insert shown in FIG. 1.

As is the case with the insert described in the copending European patent applications, the cutting edges 7 and 8 of the insert 1 slope in opposite senses so as to define acute angles with the corresponding edges of the base of the insert, thereby imparting increased but oppositely directed axial rake angles to the opposite sides of the insert. Thus, the height of the insert at one pair of diametrically opposed corners thereof is greater than the height of the insert at the opposite pair of diametrically opposed corners.

Again, as in the case of the insert described in the copending European patent applications, the relief flank 11 is divided at a line 12 into a narrow, upper, continuously curved flank portion 11a and a lower planar flank portion 11b, the curvature of the upper flank portion 11a being such that the relief and radial rake angles along the length of the cutting edge remain substantially invariant. The opposite relief flank of the insert (not seen) is similarly divided and shaped.

In a similar fashion as with the insert illustrated and described in U.S. Pat. No. 5,052,863, the cutting edges 7 and 8 are themselves curved, the curvature being such that each cutting edge forms part of the curved side of a plane which intersects a cylinder constituting a surface of revolution of the cutting edge at an angle corresponding to the axial rake angle of the insert in the milling cutter. For a full and detailed description of the mode of determination of this curvature of the cutting edge as well as the curvature of the upper flank portion 11a, reference is directed to U.S. Pat. No. 5,052,863.

Figure 7:
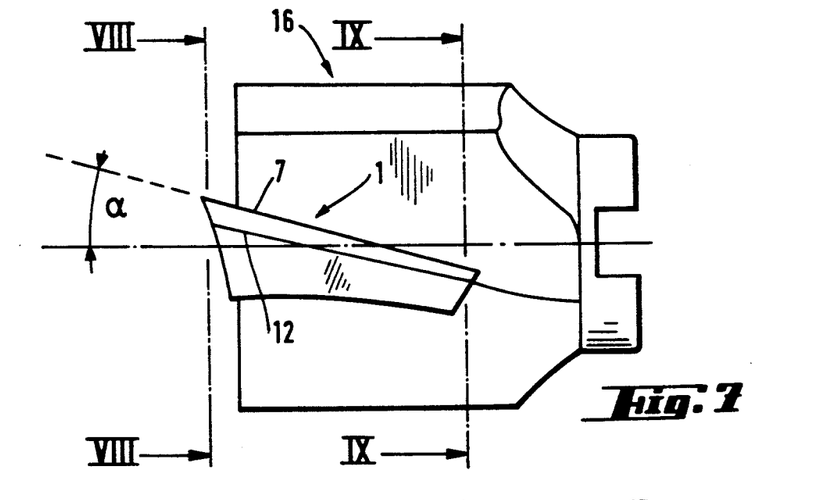
FIG. 7 is a schematic side elevation of a milling cutter incorporating a cutting insert in accordance with the invention.
Figure 8:
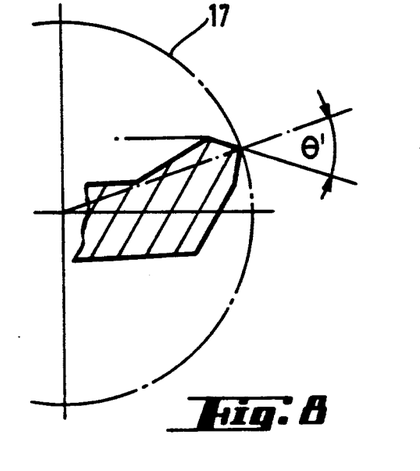
FIG. 8 is a cross-sectional view taken along the line VIII—VIII of the insert shown in FIG. 7 superimposed on an associated circular cutting path.
Figure 9:
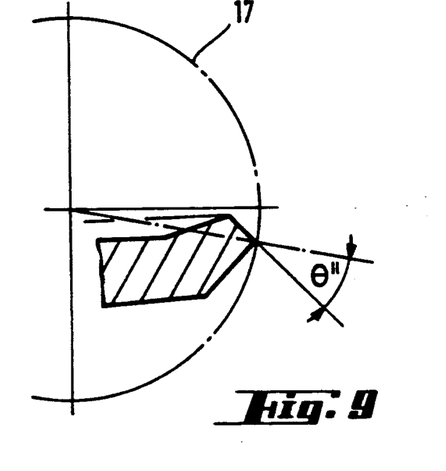
FIG. 9 is a similar cross-sectional view taken along the line IX—IX.
Figure 10:
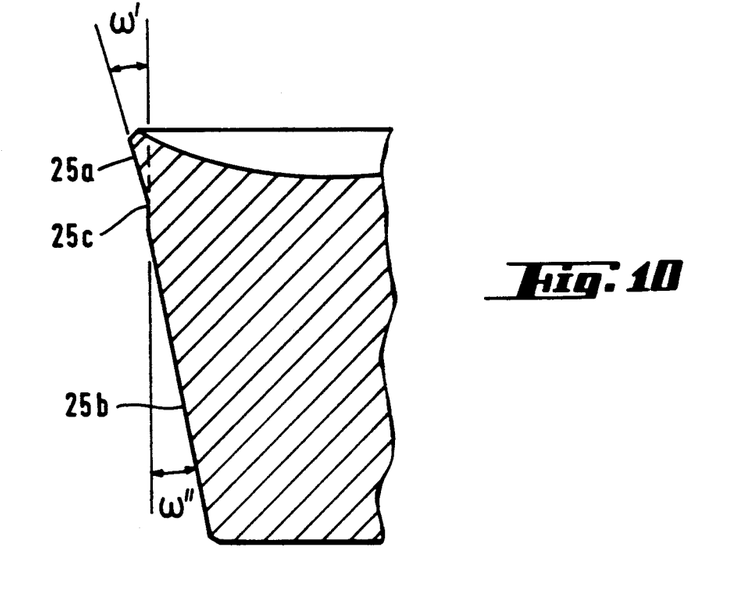
FIG. 10 is a cross-sectional view on an enlarged scale along the line X—X of a portion of the insert shown in FIG. 1.

The cutting edges 7 and 8 are respectively separated from their associated cutting rake surfaces 9 and 10 by land surfaces (referred to as K-lands), one of these land surfaces 15 being shown in FIGS. 5 through 9 of the drawings. The K-land is formed with a helically curved surface. Reference will now be made to FIGS. 7, 8 and 9 of the drawings for an understanding as to the mode and result of this helical shaping of the K-land surface.

As seen in FIG. 7, the cutting insert 1 is mounted in an appropriate peripheral recess of a cylindrical holder 16 with its cutting edge 7 defining an axial rake angle $\alpha$ with respect to the axis of the cylindrical holder.

Referring to FIGS. 8 and 9, there are here seen respective cross-sectional views of a portion of the insert 1 taken along the lines VIII—VIII and IX—IX (corresponding to leading and rear portions of the insert 1), shown respectively superimposed on a circular path 17 followed by the respective point on the cutting edge lying on the respective section line. As can be seen, the K-land surface 15 defines, together with a radial line of the circular path extending from the centre of this path to the point of the cutting edge lying along the section line, an angle $\theta$ which, in FIG. 8, is indicated as $\theta'$, and in FIG. 9 is indicated as $\theta''$.

As a result of the particular helical curvature of the K-land 15, it is ensured that $\theta'$ is substantially equal to $\theta''$, i.e. the angle $\theta$ remains substantially invariant along the length of the cutting edge.

Figure 4:
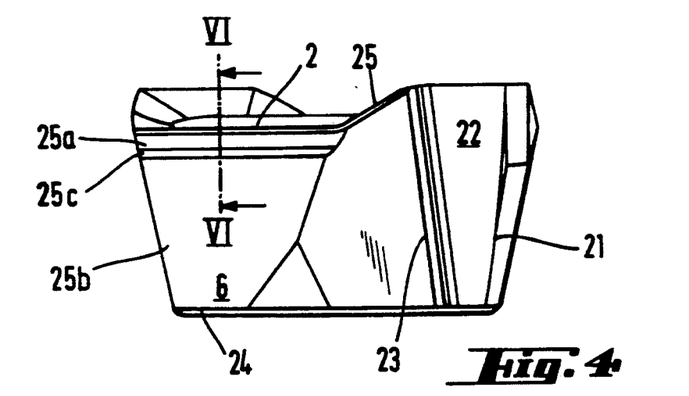
FIG. 4 is an end elevation of the insert shown in FIG. 1.
Figure 5:
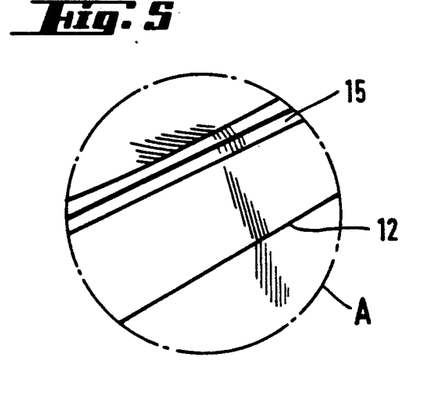
FIG. 5 is a view on an enlarged scale of a detail A of the insert shown in FIG. 1.
Figure 6:
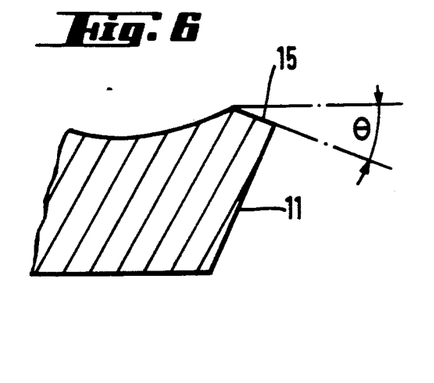
FIG. 6 is a cross-sectional view on an enlarged scale taken along the line VI—VI of the insert shown in FIG. 4.

Reference will now be made to FIGS. 1 and 4 of the drawings for a description of the first pair of relief flanks, only one, 6, being shown. As seen, the relief flank 6 is provided on the side thereof adjacent the relief flank 11 with a projection 21, formed with a grounding wiper surface 22 which serves as the wiper surface when milling is effected by the cutting edge 7, this wiper surface 22 being located at right angles with respect to the cutting edge 7. The projection 21 is separated from the relief flank 6 by a recessed portion 23. The cutting edge 2 is directed so as to be substantially parallel to a corresponding base edge 24 of the insert. Whilst in the embodiment being now described and as shown in the drawings, the cutting edge 2 is substantially parallel to the base edge 24, a construction wherein the cutting edge 2 tapers slightly downwardly by an angle of up to 15° with respect to the base edge 24 from the corner thereof adjacent the wiper 21, can be equally envisaged. It will be readily seen from FIGS. 1 and 4 of the drawings that, in order to ensure the correct disposition of the cutting edge 2 with respect to the base edge 24, the upper edge of the wiper portion of the insert 21 merges with the cutting edge 2 via a downwardly sloping portion 25.

Figure 11:
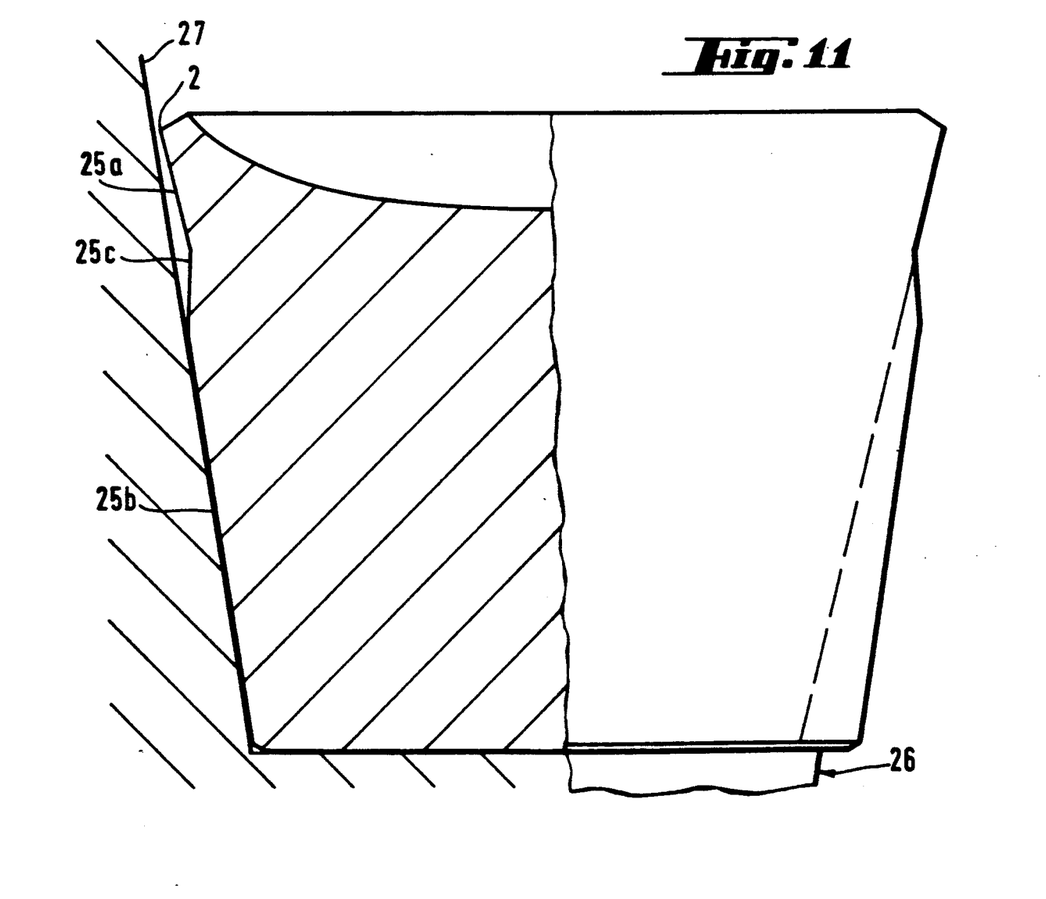
FIG. 11 is a still further enlarged cross-sectional view of the insert shown in FIG. 1 illustrating the location of the insert in the seating of a tool holder.
Figure 12:
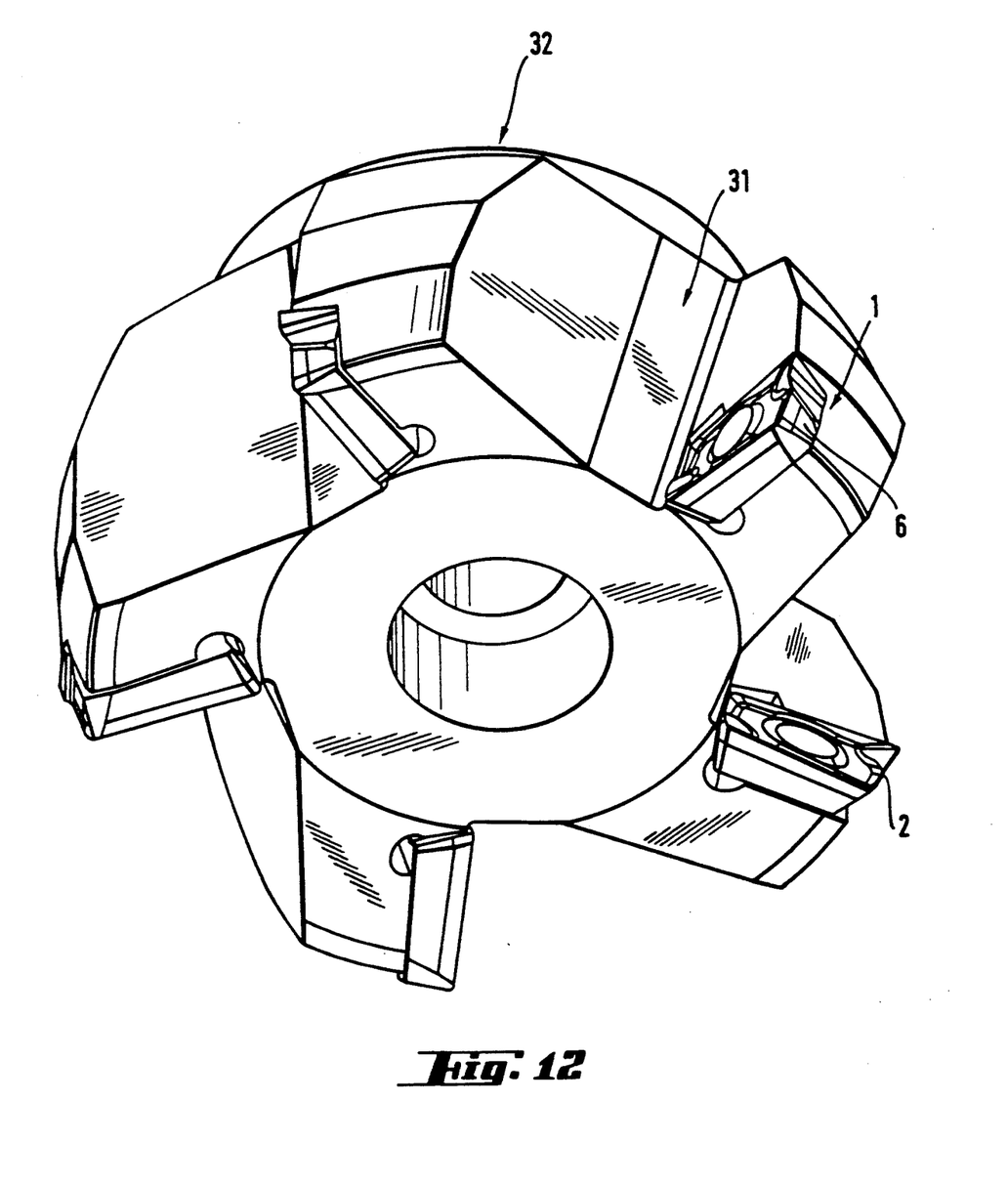
FIG. 12 is a perspective view of a milling cutter incorporating cutting inserts in accordance with the invention and as illustrated in FIGS. 1 to 11 mounted for use in face milling.

Reference will now be made to FIGS. 4, 11 and 12 of the drawings for a detailed description of the construction of the relief flank 6. As can be seen, the relief flank 6 consists of three consecutive portions, all extending along the length of the cutting edge 2, namely a first relief flank portion 25a adjacent the cutting edge 2, a second relief flank portion 25b adjacent the base edge 24 and an intermediate relief flank portion 25c between the portions 25a and 25b. As seen clearly in FIGS. 11 and 12 of the drawings, the first relief flank portion 25a presents a first relief flank angle $\omega'$ with respect to a normal to the base of the insert, whilst the second relief flank portion 25b presents an angle $\omega''$ with respect to said normal, where $\omega'$ is greater than $\omega''$ and in the specific example now being considered, $\omega' = 15°$ whilst $\omega'' = 11°$. The intermediate portion 25c, on the other hand, is directed transversely to the first and second portions 25a and 25b and, as can be clearly seen from FIGS. 10 and 11 of the drawings, the intermediate portion 25c defines an angle with the first portion 25a which is less than 180°.

If now we consider FIG. 12 of the drawings, wherein the insert is shown supported on a tool seating 26 having a side wall 27 directed at angle corresponding to $\omega''$, it will be readily seen that the particular construction of the relief flank just described carries with it the following advantages:

Thus, whilst the cutting edge 2 is associated with a relief flank portion 25a having an optimally large relief flank angle $\omega'$ (say 15°), the fact that the bulk of the insert is formed with a relief flank portion 25b having a significantly lesser relief flank angle $\omega''$ (say 11°), carries with it as a consequence that the unsupported overhang of the insert which would be very substantial if the entire relief flank angle corresponded to $\omega'$ (see the dotted line extension of the relief flank portion 25a in FIG. 12 of the drawings). This overhang is, however, kept relatively low in view of the fact that the overwhelming bulk of the insert has a relief flank portion 25b with the lower relief flank angle $\omega''$.

Furthermore, the insert can be readily and securely accommodated in a tool cutter seating whose side wall is directed at an angle which is the conventional angle adopted for this purpose (say 11°), and this despite the fact that the relief flank portion 25a is directed at a significantly greater angle. Furthermore, and as clearly seen in FIG. 12 of the drawings, despite the fact that the insert is supported by the side wall with which it makes contact over the entire extent of the relief flank portion 25b, the actual cutting edge 2 of the insert is slightly spaced from the side support wall 27, thereby ensuring that this edge 3 is not damaged by being clamped against the side wall 27.

As has been previously explained, the cutting edges 7 and 8 of the insert are associated with wiper surfaces 22 formed on projecting wiper portions 21 which flank the cutting edges 2 and 3. The cutting edges 2 and 3, in their turn, are respectively associated with wiper surfaces 28 and 29, which flank the cutting edges 7 and 8 at diametrically opposed corners of the insert and which constitute extensions of the relief flank surfaces 11 (only one shown) but are angularly directed with respect to these relief flank surfaces. Conveniently, these wiper surfaces 28 and 29 are formed during the press sintering of the insert as a whole.

Figure 13:
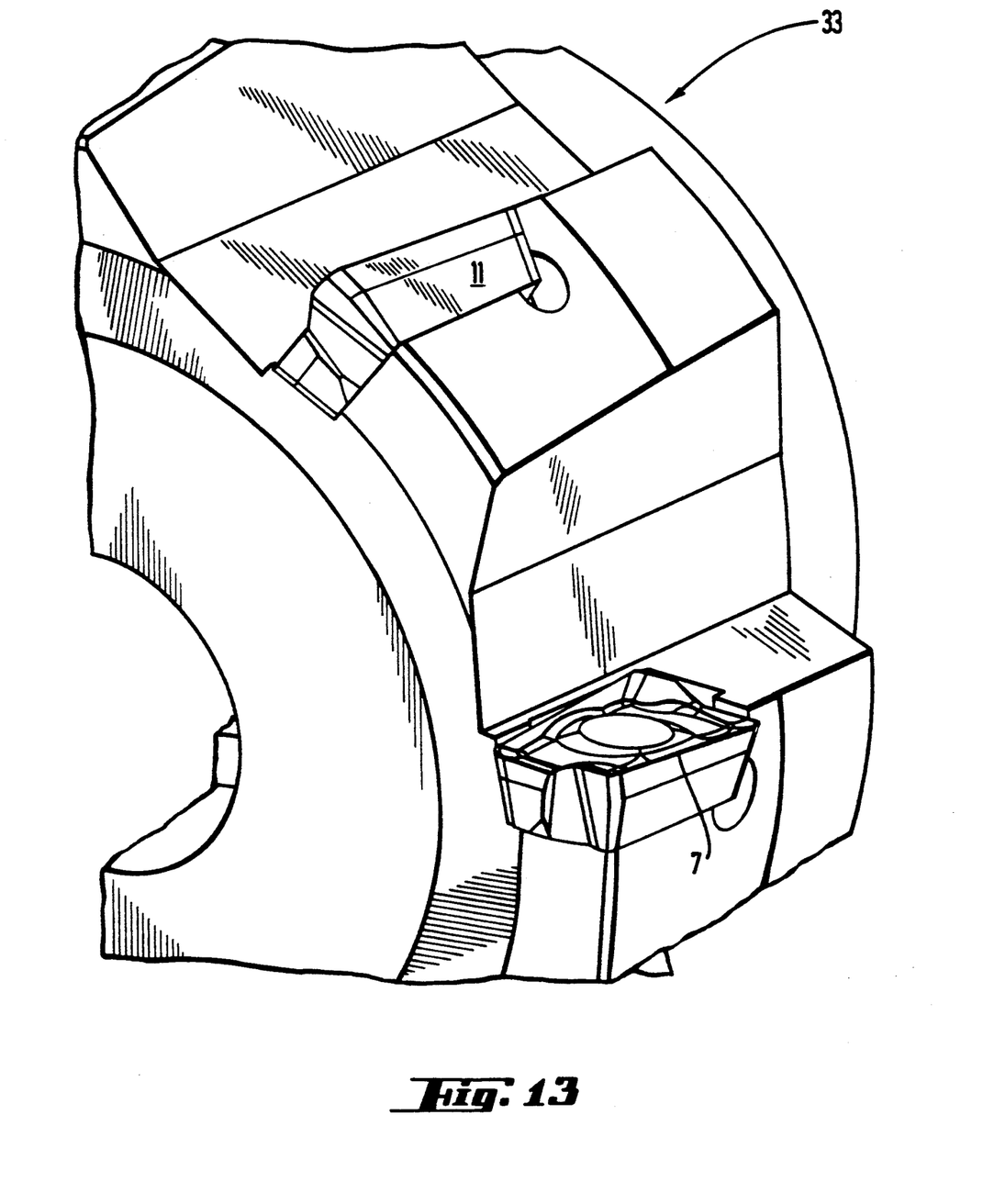
FIG. 13 is a perspective view of a milling cutter incorporating cutting inserts in accordance with the invention and as illustrated in FIGS. 1 to 11 mounted for use in shoulder milling.
Figure 15:
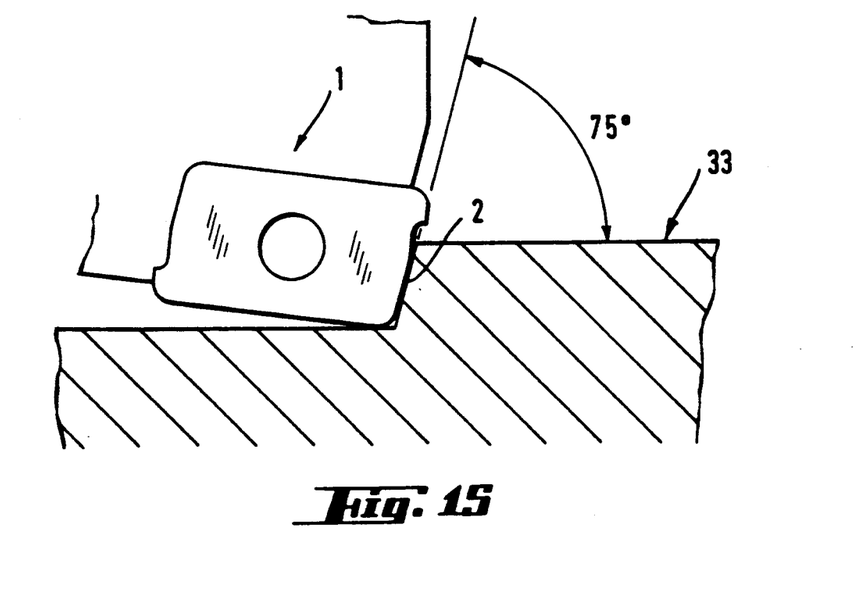
FIG. 15 illustrates schematically the use of the cutting insert in face milling.

FIG. 13 shows how cutting inserts 1 as described are mounted in successive peripheral recesses 31 of a milling cutter 32 which has been specially designed for face milling with the relief flank surfaces 6 and cutting edges 2 operationally exposed. FIG. 15 shows schematically how such a milling cutter provided with such a milling insert is effective in face milling a work piece by the successive milling of a shoulder directed at an angle of 75°.

Figure 14:
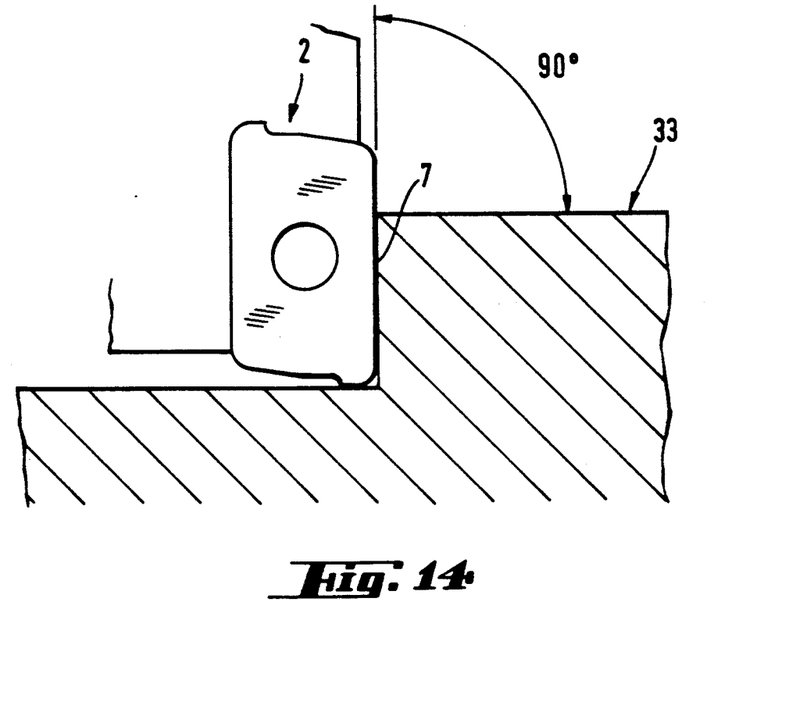
FIG. 14 illustrates schematically the use of the cutting insert in shoulder milling.

FIG. 14, on the other hand, shows a portion of a milling cutter 33 for use in a 90° shoulder milling operation, wherein the insert 1 as described above is so mounted as to have its cutting edge 7 and relief flank 11 operationally exposed and so, as seen schematically in FIG. 15 of the drawings, to mill a 90° shoulder structure.

Whilst the present invention has been specifically described with reference to inserts having flank relief angle portions respectively of 15° and 11°, the present invention is equally applicable to inserts wherein the flank relief angle portions range, for example, as far as the upper flank relief angle is concerned, between 7° and 20°, whilst as far as the lower flank relief angle is concerned, between 0° and 15°.

The cutting inserts as described above, and being formed as they are with pairs of adjacent cutting edges 7, 2 and 8, 3 wherein at least one cutting edge of each pair is formed with a relatively high relief flank angle ω', are particularly useful when the milling cutter is employed in the so-called "plunging" milling action. In this action the milling cutter is, as usual, rotated about its longitudinal axis with respect to a work piece with milling being effected by the longitudinally directed edges of the inserts. At the same time, however, the cutter is displaced longitudinally with respect to the work piece, thereby ensuring simultaneous milling by the transversely directed cutting edges of the inserts. If now, as in the case of the inserts just described, these transversely directed edges are associated with relief flank portions having relatively high relief flank angles (ω'), the "plunging" operation can be effected with much less wear on the inserts and with consequent less milling forces than would otherwise be the case.

I claim:

1. A cutting insert of substantially parallelipipedal shape and comprising a first pair of opposite cutting edges respectively defined between first pairs of cutting rake surfaces and relief flank surfaces, a second pair of opposite cutting edges respectively defined between second pairs of cutting rake surfaces and relief flank surfaces; each relief flank surface of said first pair of relief flank surfaces comprising a first portion defined between a cutting edge and an intermediate portion of said relief flank surface and a second portion defined between said intermediate portion and a base of the insert, said first portion presenting a first relief flank angle, said second portion presenting a second relief flank angle, said first relief flank angle being significantly greater than said second relief flank angle, said intermediate portion bridging said first and second portions and being directed transversely with respect to said first and second portions.

2. A cutting insert according to claim 1, wherein said second pair of cutting rake and relief flank surfaces are continuously curved so that their insert rake and relief angles as defined with respect to the cylindrical holder remain substantially invariant along the lengths of the respective cutting edges.

3. A cutting insert according to claim 2, wherein said second pair of relief flank surfaces each comprises a continuously curved upper portion and a substantially planar lower portion.

4. A cutting insert according to claim 1, wherein each cutting edge of said second pair of cutting edges is curved and forms part of the curved side of a plane which intersects a cylinder, constituting a surface of revolution of said cutting edge, at an angle corresponding to the axial rake angle of the insert in the milling cutter.

5. A cutting insert according to claim 1, wherein said insert is formed by pressing and sintering.

6. A cutting insert according to claim 1, wherein said relief flank surfaces constitute two pairs of successive relief flank surfaces, each pair having a common insert corner, the cutting edge of one of the relief flank surfaces of each pair being associated with a wiper formed on the other relief flank surface of that pair adjacent a common insert corner.

7. A cutting insert according to claim 6, wherein a first of the relief flank surfaces of said pair is of extended length than the second of the relief flank surfaces of said pair, the wiper surface on said second relief flank surface being formed on a projection of said insert.

8. A cutting insert according to claim 7, wherein said wiper surface is formed by grinding.

9. A cutting insert according to claim 7, wherein the wiper surfaces on the first relief flank surfaces are formed during pressing of the insert.

10. A cutting insert according to claim 1 wherein said first pair of cutting edges are spaced from their associated cutting rake surfaces by respective land surfaces.

11. A cutting insert according to claim 10, wherein each land surface is so curved that the land surface angle as defined with respect to the cylindrical holder remains substantially invariant along the length of the cutting edge.

12. A cutting insert according to claim 1, wherein said first cutting edges slope, in respectively opposite senses, towards the insert base, such first cutting edge sloping towards the insert base in a direction from a leading end of the cutting edge and wherein said second cutting edges slope towards the insert base in a direction from a leading end of the cutting edge by an angle of between 0° and 15°.

13. A cutting insert according to claim 12, wherein said second cutting edges are substantially parallel to said insert base edges.

14. For use in a peripheral rotary milling cutter having a cylindrical holder and at least one replaceable, peripherally disposed cutting insert, a cutting insert of substantially parallelipipedal shape and comprising a first pair of opposite cutting edges respectively defined between first pairs of cutting rake surfaces and relief flank surfaces; a second pair of opposite cutting edges respectively defined between second pairs of cutting rake surfaces and relief flank surfaces, said first pair of cutting edges being of reduced length as compared with said second pair of cutting edges; the relief flank surfaces of said first pair respectively defining, with the adjacent relief flank surfaces of said second pair, first and second pairs of common insert corners; a first pair of wipers formed on the relief flank surfaces of said second pair of relief flank surfaces adjacent a first pair of diagonally opposed insert corners so as to be associated respectively with the cutting edges of said first pair of cutting edges; and a second pair of wipers formed on the relief flank surfaces of said first pair of relief flank surfaces adjacent a second pair of diagonally opposed insert corners so as to be associated respectively with the cutting edges of said second pair of cutting edges, each of the first pair of wipers having a wiper edge which defines an obtuse angle with its associated cutting edge.

15. A cutting insert according to claim 14, wherein said wipers are formed by grinding.

16. A cutting insert according to claim 14, wherein the wipers are formed during pressing of the insert.

17. A cutting insert according to claim 14, wherein the cutting edges of said first pair are inclined towards a base of said insert in a direction from their associated wipers.

* * * * *